United States Patent [19]

Esmersoy

[11] Patent Number: 5,214,613
[45] Date of Patent: May 25, 1993

[54] METHOD AND APPARATUS FOR DETERMINING PROPERTIES OF ANISOTROPIC ELASTIC MEDIA

[75] Inventor: Cengiz Esmersoy, Danbury, Conn.
[73] Assignee: Schlumberger Technology Corporation, New York, N.Y.
[21] Appl. No.: 667,835
[22] Filed: Mar. 12, 1991
[51] Int. Cl.$^5$ .................... G01V 1/40; G01V 1/36
[52] U.S. Cl. .................... 367/31; 367/57; 367/73; 364/422
[58] Field of Search .............. 367/31, 35, 57, 73; 364/421, 422, 150, 151, 223.9, 924.5, 806

[56] References Cited

U.S. PATENT DOCUMENTS

| | | | |
|---|---|---|---|
| 4,399,525 | 8/1983 | Thompson et al. | 367/75 |
| 4,415,999 | 11/1983 | Moeckel et al. | 367/73 |
| 4,563,757 | 1/1986 | Decorps et al. | 367/33 |
| 4,648,039 | 3/1987 | Devaney et al. | 364/421 |
| 4,809,239 | 2/1989 | Esmersoy | 367/57 |
| 4,969,130 | 11/1990 | Wason et al. | 367/73 |
| 5,060,204 | 10/1991 | Winterstein | 367/31 |
| 5,079,749 | 1/1992 | Aminzadeh et al. | 367/73 |
| 5,081,611 | 1/1992 | Hornby | 367/25 |

OTHER PUBLICATIONS

Esmersoy, C.; Geophysics, vol. 52, #3, p. 436, Mar. 1987; also SEG Mtg., Nov. 6, 1986, Pap No. S164.
Esmersoy, C; 52nd EAEG Mtg., Jun. 1, 1990, Abst. pp. 96-97: Abstract only supplied.
Mallick et al., S. Geophys. RES., vol. 95, #B6, pp. 8513-8526, Jun. 10, 1990; Abst. only supplied.
S. Crampin, Evaluation of Anisotropy By Shear-Wave Splitting, Geophysics 50, 142-152 (1985).
D. F. Winterstein, Shear Waves In Exploration: A Perspective, 57th Ann. International Mtg., Soc. Expl. Geophys., Expanded Abstracts, 638-641 (1987).
D. F. Becker and A. I. Perelberg, Seismic Detection of Subsurface Fractures, 56th Ann. International Mtg. Soc. Expl. Geophys., Expanded Abstracts, 466-468 (1986).
R. M. Alford, Shear Data In The Presence Of Azimuthal Anisotropy, 56th Ann. International Mtg., Soc. Expl. Geophys., Expanded Abstracts, 476-479 (1986).
D. H. Johnston, VSP Detection of Fracture-Induced Velocity Anisotropy, 56th Ann. International Mtg., Soc. Expl. Geophys., Expanded Abstracts, 464-466 (1986).
Naville, Detection of Anisotropy Using Shear-Wave Splitting In VSP Surveys: Requirements and Applications, 56th Ann. International Mtg., Soc. Expl. Geophys., Expanded Abstracts 391-394 (1986).
L. Nicoletis et al., Shear-Wave Splitting Measurements From Multishot VSP Data, 56th Ann. International Mtg. Soc. Expl. Geophys., Expanded Abstracts, 527-530 (1988).
Esmersoy, P And SV Inversion From Multicomponent Offset VSPs, Geophysics, vol. 50, (Jan. 1990).
Nicoletis et al., 1-D Modeling of Shear Waves In Anisotropic Medium, 56th Ann. International Mtg., Soc. Expl. Geophys., Expanded Abstracts, 1133-1136 (1988).
SAT Seismic Acquisition Tool, Schlumberger, Brochure, 6 pages (1989).

Primary Examiner—Nelson Moskowitz
Attorney, Agent, or Firm—Martin M. Novack; Marc D. Foodman; Leonard W. Pojunas

[57] ABSTRACT

A technique is disclosed for determining properties of an anisotropic elastic medium, such as earth formations. Acoustic waves are established in the medium. At several spaced locations in the medium, there are measured at least two orthogonal components of acoustic waves which have propagated through the medium. For positions corresponding to a plurality of adjacent ones of the spaced locations, there are computed model composite waves which would result from the superposition of a plurality of model acoustic waves, each having selected model parameters. The model acoustic waves include a plurality of model acoustic shear waves and the model parameters include model velocities and model polarizations for each of the model acoustic shear waves. An error value is determined, the error value depending on the differences, at each of the plurality of adjacent ones of the locations, between measured wave components and the model composite wave. The model parameters are then modified. The computing, determining, and modifying steps are then iteratively repeated to reduce the error. The ultimately modified model parameters are stored as being indicative of properties of the medium in the region of at least one of the plurality of locations.

39 Claims, 8 Drawing Sheets

FIG. 6

METHOD AND APPARATUS FOR DETERMINING PROPERTIES OF ANISOTROPIC ELASTIC MEDIA

FIELD OF THE INVENTION

This invention relates to investigation of elastic media and, more particularly, to a method and apparatus for determining properties of anisotropic elastic media such as earth formations.

BACKGROUND OF THE INVENTION

The measurement of acoustic waves that propagate in an elastic medium can provide useful information about the characteristics of the medium. For example, it is well known that mechanical disturbances can be used to establish acoustic waves in earth formations and the properties of these waves, also called seismic waves, can be measured to obtain important information about the formations through which the waves have propagated. In particular, parameters of compressional and shear waves, such as their velocity and polarization directions, can be indicators of formation characteristics that help in evaluation of the location and/or producibility of hydrocarbon resources. Reference can be made, for example, to my U.S. Pat. No. 4,809,239, assigned to the same assignee as the present application, which relates, inter alia, to a method for evaluating the velocity and direction of propagation of compressional and shear wave components propagating through earth formations, and to a technique for separating the individual waveforms of such components. Reference can also be made to U.S. Pat. No. 4,648,039, also assigned to the same assignee as the present application.

Detection of fractured zones and estimation of their properties, such as fracture orientation and fracture density, is of interest in exploration and production geophysics. The most prominent effect of aligned vertical (or near vertical) fractures on seismic waves is the splitting of shear waves. Theoretical predictions of shear-wave splitting has been confirmed by field observations over the last decade [e.g. S. Crampin, Evaluation Of Anisotropy By Shear-Wave Splitting, Geophysics 50, 142-152 (1985); D. F. Winterstein, Shear Waves In Exploration: A Perspective, 57th Ann. International Mtg., Soc. Expl. Geophys., Expanded Abstracts, 638-641 (1987)]. Shear wave splitting occurs when a shear wave separates into two phases with different velocities and different polarizations. Splitting is apparently caused by stresses, microcracks, or any other oriented inclusions in the formations. Once it is known that for fracture delineation one is looking for split-shear waves, the next question is how to find and extract information from split-shear waves in seismic data.

Multicomponent Vertical Seismic Profiles (VSPs) provide an excellent data set for the analysis of depth-dependent properties of fractured zones. FIG. 1 illustrates a simple shear VSP experiment for fracture delineation. Shear waves generated by a source 105 on the earth's surface are recorded in a borehole 102 by the horizontal (x,y) components of downhole geophones, represented at 111-115, as the waves propagate vertically across the horizontal layers. In regions containing oriented vertical fractures, shear waves split into two waves. The faster wave $S_1$ is polarized along the fracture orientation and the slower wave $S_2$ is polarized perpendicular to $S_1$.

For detection and evaluation of split-shear waves several techniques have been proposed and applied to field data with varying degrees of success. S. Crampin (1985), cited above, uses the polarization direction of the initial (fast) shear wave to determine the fracture orientation and the onset of the second wave [indicated by the rapid turn-around in the hodogram—see D. F. Becker and A. I. Perelberg, Seismic Detection of Subsurface Fractures, 56th Ann. International Mtg. Soc. Expl. Geophys., Expanded Abstracts, 466–468 (1986)] to determine the delay between the split-shear waves. Hodograms, also known as polarization diagrams, illustrate mutually perpendicular particle displacements over a given time period. Hodograms represent point measurements in space, and are therefore very sensitive to local variations of the medium properties. However, in the presence of interfering waves, such as converted compressional (P) waves, multiples, and reflected waves, hodograms can be misleading and/or impossible to interpret.

In R. M. Alford, Shear Data In The Presence Of Azimuthal Anisotropy, 56th Ann. International Mtg., Soc. Expl. Geophys., Expanded Abstracts, 476–479 (1986), there is disclosed use of a source-receiver rotation procedure to separate the two shear waves in areas where there is only one dominant direction of azimuthal anisotropy (e.g., due to fractures). Once the data are rotated, the separated shear waves can be processed by conventional techniques to obtain the fast and slow shear interval velocities [D. H. Johnston, VSP Detection of Fracture-Induced Velocity Anisotropy, 56th Ann. International Mtg., Soc. Expl. Geophys., Expanded Abstracts, 464–466 (1986)].

Naville [Detection of Anisotropy Using Shear-Wave Splitting In VSP Surveys: Requirements and Applications, 56th Ann. International Mtg., Soc. Expl. Geophys., Expanded Abstracts 391-394 (1986)] proposes a technique using the cross correlations between two depth levels. It is assumed that the data consist of only two downgoing shear waves without any interference from reflections, conversions, etc.

L. Nicoletis et al. [Shear-Wave Splitting Measurements From Multishot VSP Data, 56th Ann. International Mtg. Soc. Expl. Geophys., Expanded Abstracts, 527–530 (1988)] propose a technique to obtain the transmission operator between two depth levels using two linearly independent source polarizations. The transmission operator, in turn, gives the fracture orientation, velocities and attenuations of two shear waves. Their technique also assumes only two shear waves without any interference. The transmission matrix is estimated at each frequency separately, whereas the fracture orientation and velocities (to a large degree) are independent of frequency.

It is among the objects of the present invention to provide improvement over the described types of prior art techniques.

SUMMARY OF THE INVENTION

A form of the present invention is directed to a technique for determining properties of an anisotropic elastic medium, such as earth formations. Acoustic waves are established in the medium. At several spaced locations in the medium, there are measured at least two orthogonal components of acoustic waves which have propagated through the medium. For positions corresponding to a plurality of adjacent ones of the spaced locations, there are computed model composite waves which would result from the superposition of a plurality of model acoustic waves, each having selected model parameters. The model acoustic waves include a plurality of model acoustic shear waves and the model parameters include model velocities and model polarizations for each of the model acoustic shear waves. An error value is determined, the error value depending on the differences, at each of said plurality of adjacent ones of the spaced locations, between measured wave components and the model composite wave. The model parameters are then modified. The computing, determining, and modifying steps are then iteratively repeated to reduce the error. The ultimately modified model parameters are stored as being indicative of properties of the medium in the region of at least one of said plurality of locations.

In a disclosed embodiment of the invention, local wave field inversion (or decomposition) is viewed as a parametric least-squares minimization problem. At the depth of interest, three-component data at a plurality of neighboring depth levels are modeled as the superposition of a number of waves with locally planar wavefronts. In modeling split shear waves, the general case has four basic waves; i.e., the up and down going fast shear wave and the up and down going slow shear wave. In the case of offset VSPs and/or three dimensional structures, there can also be direct or converted compressional (P) waves to be modeled as up and down going waves.

Among the advantages of the disclosed technique hereof are the following:
a) it can be used in full-wave three-component offset VSPs with three dimensional structures where complicated surface multiples and other interfering waves are present;
b) it is local in space, therefore local fractured zones can be detected and analyzed;
c) all available data in a depth window are used simultaneously to obtain polarizations and velocities of split-shear waves.

Further features and advantages of the invention will become more readily apparent from the following detailed description when taken in conjunction with the accompanying drawings.

BRIEF DESCRIPTION OF THE DRAWINGS

FIG. 6 illustrates hodograms, as a function of depth, for the example of FIG. 6.

DETAILED DESCRIPTION

Figure 1:
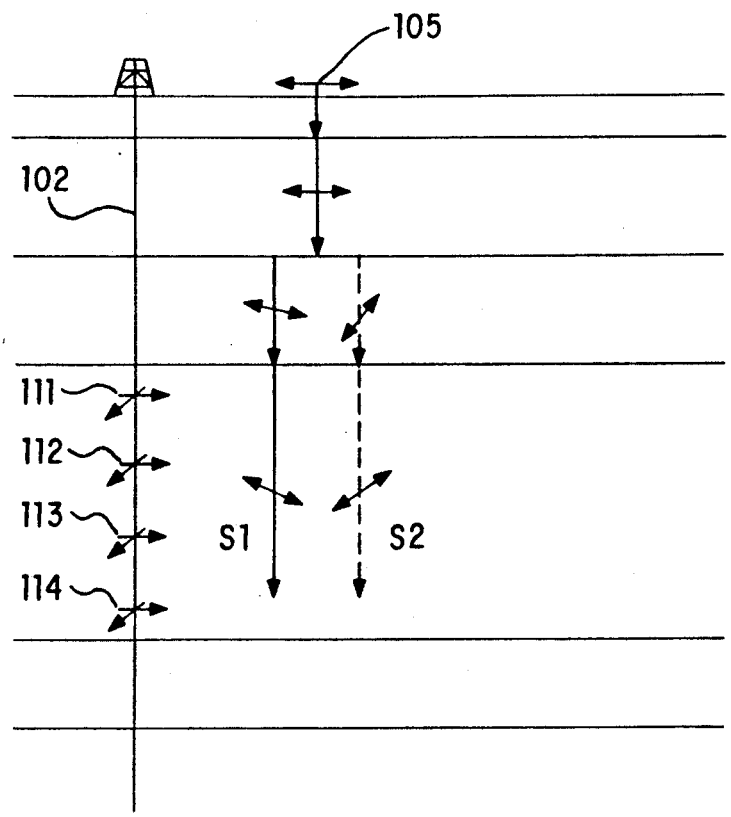
FIG. 1 is a diagram illustrating a vertical seismic profile measurement arrangement in a situation in which split-shear acoustic waves are present.
Figure 2:
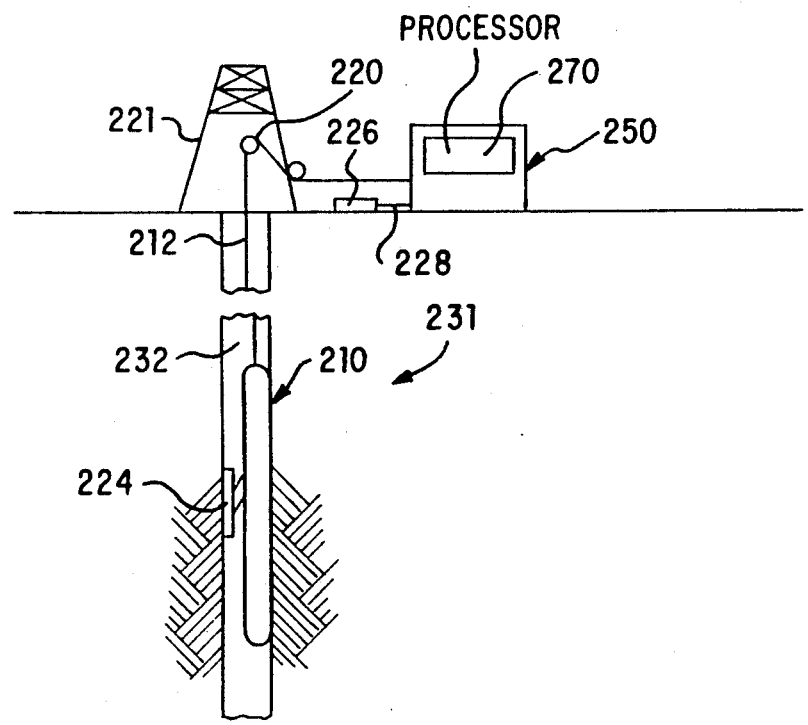
FIG. 2 is a schematic diagram, partially in block form, an apparatus which can be used in practicing an embodiment of the invention.

Referring to FIG. 2, there is shown an apparatus which can be used in practicing an embodiment of the invention. For purposes of illustration, the embodiment is set forth in terms of obtainment of zero-offset VSPs (vertical seismic profiles); that is, with a generally vertical well and an acoustic source at the wellhead. It will be understood, however, that the principles of the invention have application to offset or cross-well techniques, to techniques where source and receivers are all in a borehole such as on a logging device, and to techniques for determining properties of anisotropic elastic media in general. In FIG. 2, subsurface formations 231 are traversed by a borehole 232 which is typically, although not necessarily, filled with drilling fluid or mud. The system for acoustic data acquisition may be of the type described in the above-referenced U.S. Pat. No. 4,809,239. A logging tool 210 is suspended on an armored cable 212. The cable 212 extends up the borehole, over a sheave wheel 220 on a derrick 221 to a winch forming part of surface equipment 250. Known depth gauging apparatus (not shown) is provided to measure cable displacement over the sheave wheel 220 and accordingly the depth of the logging tool 210 in the borehole 232.

The tool 310 may be designed and constructed in accordance with the teachings of U.S. Pat. No. 4,563,757. In particular, the tool has a retractable anchoring pad 224 for urging the body of the tool 210 firmly against the wall of the borehole 232. The body of the tool 210 includes a three-axis geophone system arranged to detect particle motion along each of three orthogonal axes and to produce electrical signals indicative thereof. As is known in the art, the geophones can be gimballed so that two of them have horizontal axes and the third a vertical axis irrespective of orientation of the tool 210. A device is included in the tool 210 to produce a signal indicative of orientation of the body of the tool 210. Processing and interface circuitry within the tool 210 amplifies, samples and digitizes the tool's information signals for transmission and communicates them to the surface equipment 250 via the cable 212. Electrical power and control signals for coordinating operation of the tool 210 are generated by the surface equipment 250 and communicated via the cable 212 to circuitry provided within the tool 210.

A source of acoustic energy 226 is located on the surface, near the borehole 232. This source may be, for example, an explosive device or an airgun in a shallow liquid-filled hole, or a vibrating device pressed against the earth's surface, and can be controlled by signals transmitted along a cable 228 from the surface equipment 250. Suitable sources of these and other types are well known to those skilled in the art.

During acquisition of data, the logging tool 210 is positioned within the borehole 232, the pad 224 is extended to clamp the tool in place, and the source 226 is energized to propagate acoustic energy into the formations 231. The acoustic energy causes displacement of the particles comprising the formation 231, and this displacement is sensed by the geophones in the body of the tool 210 to generate electrical signals representative of the motion along each of the three orthogonal axes. These signals are transmitted via the cable 212 to the surface equipment 250 which receives and records them on chart and/or magnetic storage media or other storage media as a function of time.

When recording of the geophone signals at the current tool position is complete, pad 224 is released and the cable 212 is moved by the winch to bring the tool 210 to another depth in the borehole 232, whereupon the procedure is repeated. The distance through which the cable 212 is displaced generally depends on the anticipated subsequent processing of the recorded signals, which typically requires signals to be recorded at points separated by no more than a certain maximum spacing. This spacing is generally dependent, in known manner, on the minimum wavelength of the seismic signals of interest.

Further details of the operation of the tool 210 may be found in U.S. Pat. No. 4,563,757. It will be recognized that other ways of obtaining the required data may be used. As an example, a larger array of geophones may be used instead of the indicated moveable assembly.

Wave field inversion (or decomposition) can be viewed as a parametric least-squares minimization problem. At the depth of interest, three-component data at a plurality of neighboring depth levels are modeled as the superposition of several waves with locally planar wavefronts, $$\begin{pmatrix} \hat{u}_1(\omega) \\ \hat{u}_2(\omega) \\ \cdot \\ \cdot \\ \hat{u}_M(\omega) \end{pmatrix} = \sum_{n=1}^{N} \begin{pmatrix} h_n \exp(i\omega s_n z_1) \\ h_n \exp(i\omega s_n z_2) \\ \cdot \\ \cdot \\ h_n \exp(i\omega s_n z_M) \end{pmatrix} f_n(\omega), \quad (1)$$

where $\hat{u}_m$ are the three-component modeled data at depth level m. For each wave $n=1,\ldots,N$, $h_n$ is the unit polarization direction vector, $s_n$ is the apparent slowness, and $f_n(\omega)$ is the Fourier component (at frequency $\omega$) of the waveform. In modeling split-shear waves, there are four basic waves; the up and down going fast shear $S_1^+$ and $S_1^-$, and slow shear $S_2^+$ and $S_2^-$, which can be represented by $n=1,2,3,4$ in the above equations. In the case of offset VSPs and/or three dimensional structures, there are also either direct or converted P waves, and up and down going P waves can be modeled with $n=5,6$. Once there has been established a parametric model for the local wave field, the next step is to estimate the parameters by minimizing the squared error, $$E = \sum_{\omega} \sum_{m=1}^{M} ||u_m(\omega) - \hat{u}_m(\omega)||^2, \quad (2)$$

between the model $\hat{u}$ and the observed data $u$. The apparent bottleneck in this approach is the number of unknown parameters to be estimated. In particular, the number of Fourier components $f_n(\omega)$ can be large, since they are different for each frequency. However, I have demonstrated [C. Esmersoy, P and SV Inversion From Multicomponent Offset VSPs, Geophysics, 55 (1990)] that the Fourier components can be eliminated from the problem. Stated another way, and as treated further hereinbelow, the two angles of polarization direction and apparent slowness for each wave (all of which are independent of frequency) can be estimated without knowing the Fourier components. This leaves at most three parameters per wave. In some cases the number of parameters can be reduced even further. For example, the up and down going waves of the same kind (i.e., $S_1$, $S_2$ or P) may be constrained to have the same velocity and/or related polarizations. The simplest split-shear situation involves a one-dimensional medium (with arbitrary azimuthal anisotropy in each layer), vertically propagating shear waves (and therefore no P waves). In this case the local wavefield consists of at most four waves and can be modeled by only three parameters; the polarization angle and velocity of the fast shear wave, and the velocity of the slow shear wave (which has polarization orthogonal to that of the fast shear wave).

In the FIG. 2 embodiment, the processing of signals recorded uphole can be implemented using a processor 270, such as a suitably programmed general purpose digital processor with memory and peripherals conventionally provided. It will be understood, however, that the processing need not be performed at the wellsite, and that signals derived at the wellsite can be processed at a remote location.

Figure 3A:
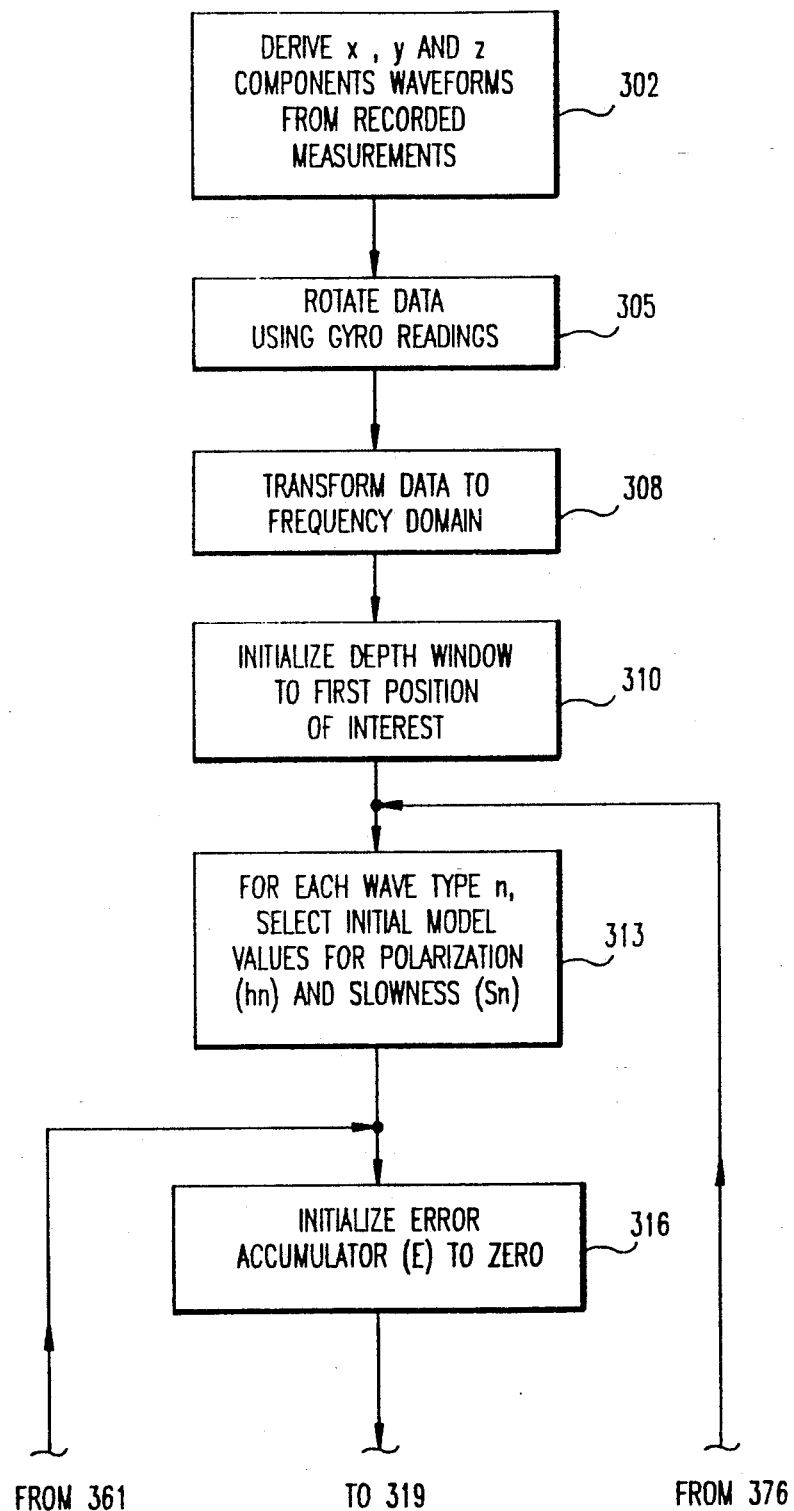
FIG. 3, which includes FIG. 3A, FIG. 3B and FIG. 3C, placed one below another, is a flow diagram of a routine for controlling the processor of the FIG. 2 system in accordance with an embodiment of the invention.
Figure 3B:
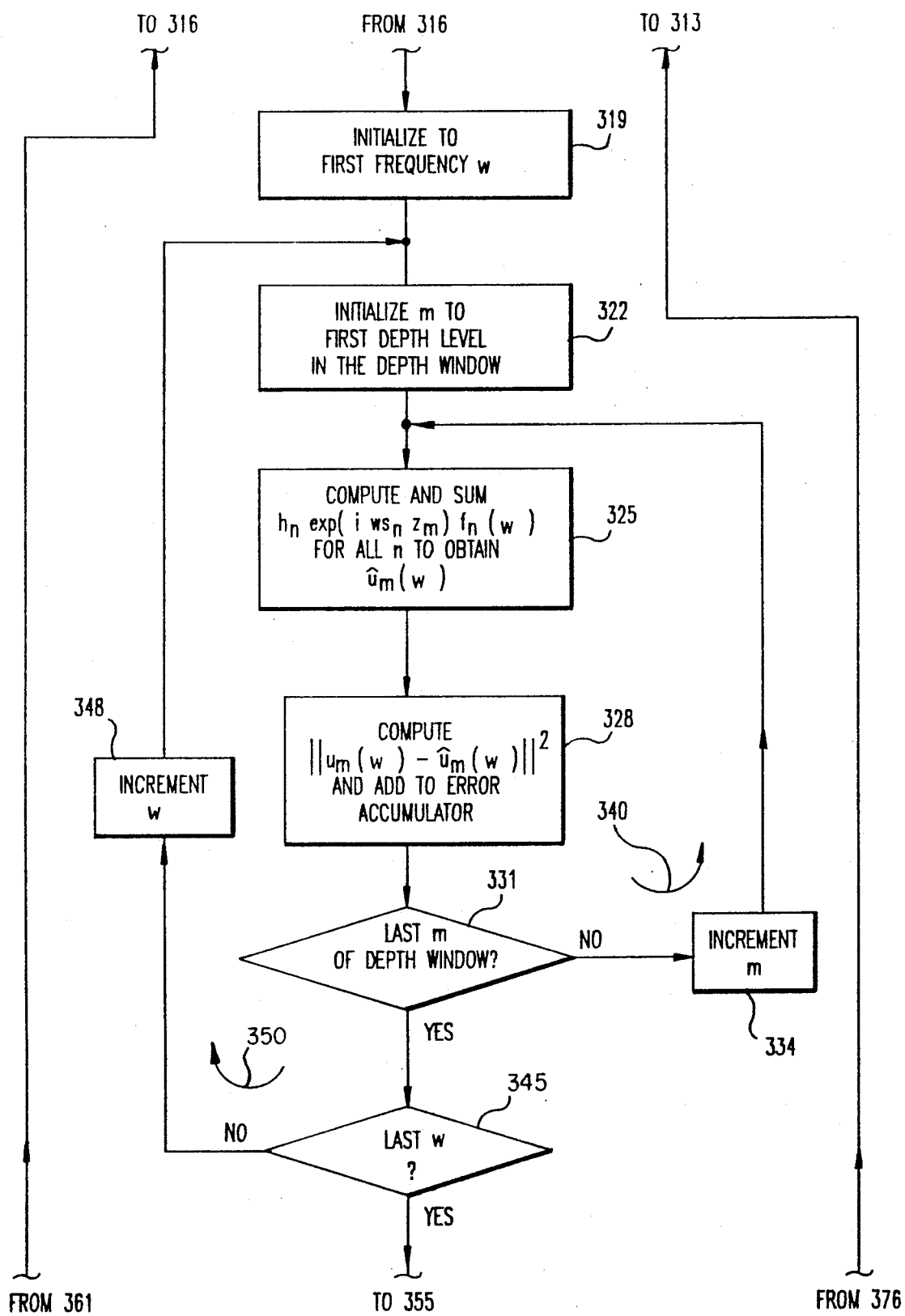
Figure 3C:
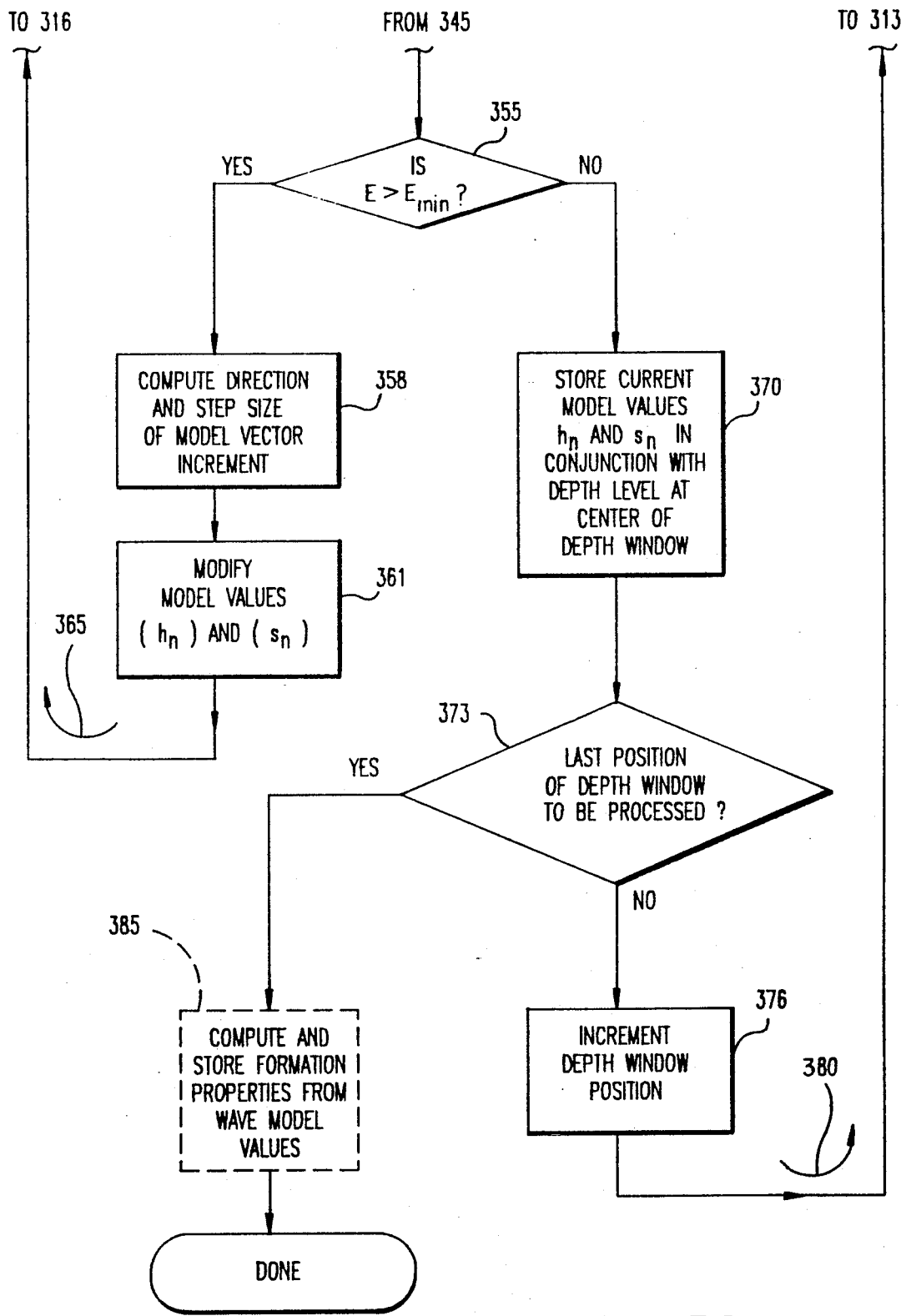

Referring to FIG. 3, there is shown a flow diagram of a routine that can be used for programming the processor 270, or other suitable general or special purpose processor, in accordance with an embodiment of the invention. The block 302 represents the deriving of measurement data for several spaced locations (depth levels, in this situation). In a general case, the data will comprise components from, x, y, and z geophones, described above, as a function of time. The block 305 represents rotation of the data waveforms, in a manner known in the art, to correct for the tool orientation. Gyro data can be used to implement the necessary corrections. Next, the block 308 represents the transformation of the data from the time domain to the frequency domain. In the present embodiment this is implemented, in the known fashion, using a Fourier transformation technique. A time window of a few tenths of a second, for example, can be used for the transformation.

The block 310 is next entered, this block representing the initializing of a depth level window to a first position of interest. The depth window includes M depth levels. For an odd numbered M, the depth window will be centered at $(2M+1)/2$, which can be considered the depth at which the depth window is positioned, and the depth to which the computed model parameters will be attributed in the present embodiment. In this embodiment the depth window is moved down (or up, if preferred) one depth level at a time, so model parameter values are generated at each depth level over the depth range of interest. The depth window size may be, for example, 5 depth levels, although any desired window size can be utilized, consistent with the desire to not excessively overlap formation features.

The block 313 is next entered, this block representing the selection of model values, for the current depth window, of the polarization vector ($h_n$) and the slowness ($s_n = 1/v_n$) for each wave type n being considered. In a general case, for example, we may have $n=6$; that is, up-going fast shear, slow shear and compressional waves, and down-going fast shear, slow shear and compressional waves. If $n=1$ is the down-going fast shear wave and $n=2$ is the down-going slow shear wave, we have $$h_1 = \begin{pmatrix} \cos\theta_1 \\ \sin\theta_1 \\ 0 \end{pmatrix} \quad (3)$$

for the down-going fast shear wave and $$h_2 = \begin{pmatrix} \cos\theta_2 \\ \sin\theta_2 \\ 0 \end{pmatrix} \quad (4)$$

for the down-going slow shear wave, where $\theta_2 = \theta_1 + \pi/2$, and $\theta_1$ and $\theta_2$ are the polarization angles (orthogonal to the propagation direction) of the respective waves. [For propagation in a direction other than the z (vertical) direction, there will also be an $h_z$ component.] The up-going waves (say, n=3,4) will typically, although not necessarily, have slownesses of opposite sign to the down-going waves. For the down and up-going waves compressional (P) waves (e.g. n=5,6), we will have, for example, $$h_5 = \begin{pmatrix} -\sin\theta_5 \\ 0 \\ \cos\theta_5 \end{pmatrix} \quad (5)$$

with the polarization vector in the direction of the polarization angle $\theta_5$, measured with respect to the z direction.

The block 316 is next entered, this block representing the initializing of an error accumulator to zero. As will be described, this accumulator is used in computing the error value E. The frequency, $\omega$, is then initialized at the first Fourier frequency component to be considered (block 319). The number of Fourier frequency components to be used can be selected as a trade-off between accuracy of representation and computation time. In an example hereof, 200 frequencies were employed, although any suitable number can be used. The index m is initialized to the first depth level in the depth window (block 322). The value $h_n \exp(i\omega s_n z_m) f_n(\omega)$ is then computed and summed, for all n (that is, all wave types in the model) to obtain $\hat{u}_m(\omega)$. This is represented by the block 325. As each set of model parameters (for a given frequency) is selected, the Fourier components can be obtained, in known manner, by equating the frequency components obtained from the measured waveforms in the depth window with the equations for the model [e.g. relationship (1)], and solving simultaneously for unknown values of $f_n(\omega)$. Reference can also be made to Esmersoy, P And SV Inversion From Multicomponent Offset VSPs, Geophysics (1990), cited above. The error component for the current frequency component, $\omega$, is then computed (block 328), in accordance with the relationship (2), and this error component is added to the error accumulator. The quantity $\hat{u}_m(\omega)$ in the general case will have x,y,z components and, as is known in the art, the vector difference (for the frequency component currently being considered) will be the difference between the three-dimensional vector for the measured values $[u_m(\omega)]$, and the three-dimensional vector for the model composite wave $[\hat{u}_m(\omega)]$, which was computed above as represented by block 325. Inquiry is then made (diamond 331) as to whether the last depth level m of the depth window has been reached. If not, m is incremented (block 334), block 325 is re-entered, and the loop 340 is continued as each depth level is considered and the computed error components are added to the error accumulator. When all depth levels in the depth window have been processed, inquiry is made (diamond 345) as to whether all frequency components have been considered. If not, the frequency is incremented (block 348), block 322 is re-entered, and the loop 350 is continued as all frequencies are considered and error components are appropriately accumulated. When the loop 350 is complete, the error, E, in the error accumulator is in accordance with relationship (2).

Inquiry is then made (diamond 355) as to whether E is greater than $E_{min}$. In this embodiment, $E_{min}$ is the error threshold of acceptability, it being understood that other criteria can be utilized. For example, it will be understood that the number of iterations can be kept track of and acceptability can be a function of the number of iterations or the extent of improvement that is obtained. Among other alternatives would be to permit a certain maximum number of iterations. In the present embodiment, if the computed error is above the predetermined threshold, the block 358 is entered, this block representing the computing of the direction and step size of the model vector increment; in other words, the manner in which the model parameters should be incremented or decremented. This type of determination is well known in the art and not, of itself, a novel feature hereof. Reference can be made, for example, to J. E. Dennis et al., Numerical Methods For Unconstrained Optimization And Non-Linear Equations, Prentice Hall (1983), and to suitable known techniques for solution of non-linear least squares problems. The model parameter values are then appropriately modified (block 361), the block 316 is re-entered, the error accumulator is reset to zero, and the loop 365 continues until the computed error is below the predetermined threshold (or other conditions are indicated, as discussed above). The block 370 is then entered, this block representing the storing of the current model parameter values, that is, $h_n$ and $s_n$, for all n, in conjunction with the depth level at the center of the depth window. Inquiry is then made (diamond 373) as to whether the routine has reached the last position of the depth window to be processed. If not, the position of the depth window is incremented (block 376), block 313 is re-entered, and the loop 380 is continued until all desired depth window positions have been processed. In the present embodiment, the depth window is moved by a single depth level (so that the center thereof is also moved by one-depth level), although it will be understood that other increments could be utilized. Regarding the re-entry to block 313 for selection of initial model values for the next depth window position, it will be understood that the final values for the previous position can be advantageously used for this purpose. [The initial estimates, for the first positioning of the depth window, can be from indications in the data itself, other data, or arbitrary guesses.] As noted above, the model parameter values computed for a particular depth level provide information concerning the formations adjacent that depth level by indicating parameters of the wave types that would be characteristic of acoustic wave propagation in such formations. If desired, and as indicated by the optional block 385, formation properties such anisotropy and its direction can be computed in known fashion from the wave model parameter values.

Figure 4:
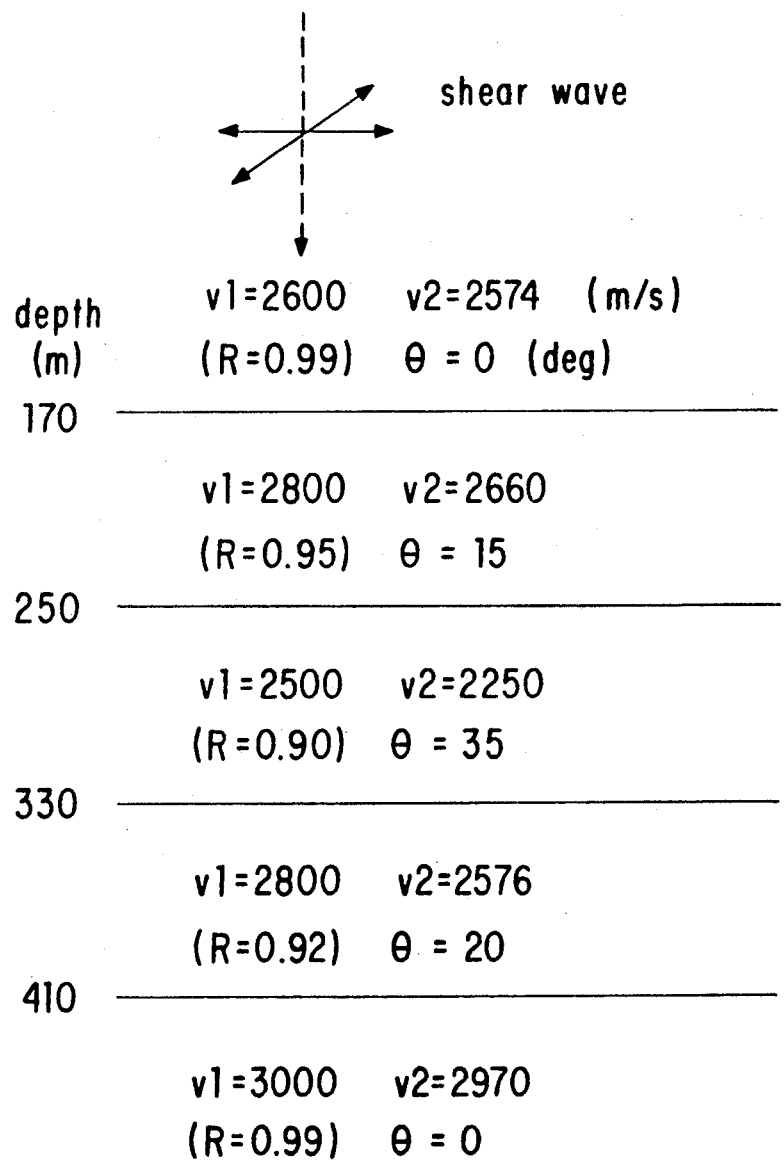
FIG. 4 illustrates a horizontally layered model with azimuthal anisotropy in each layer, that is used in an example of operation of an embodiment of the invention.
Figure 5B:
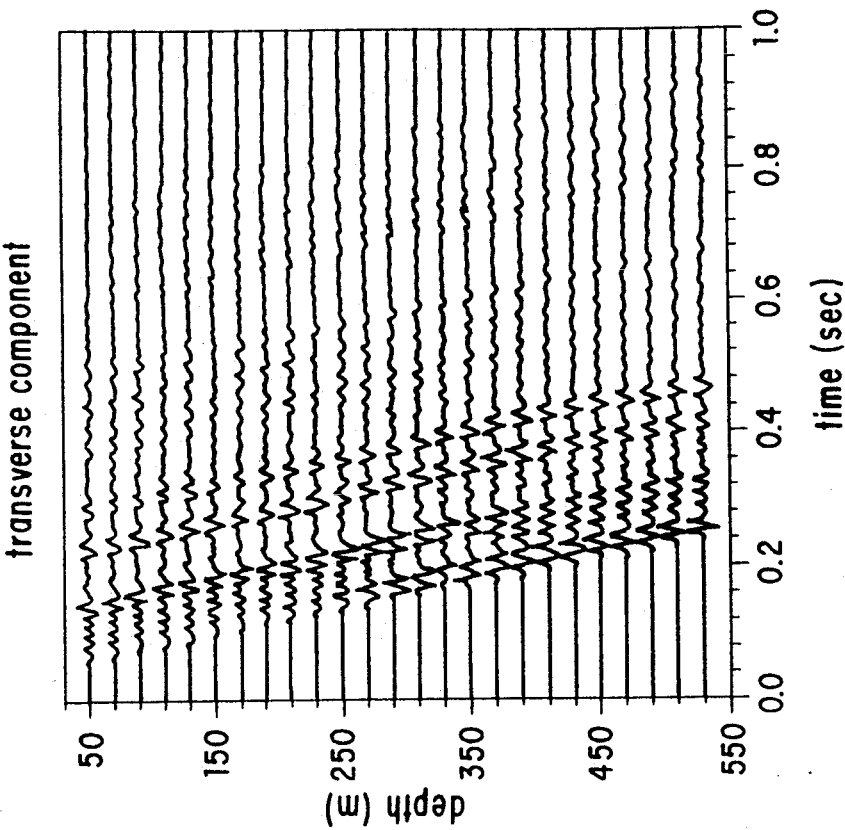
FIGS. 5A and 5B show synthetic seismograms for a vertically incident shear wave, used in the example of FIG. 4.
Figure 5A:
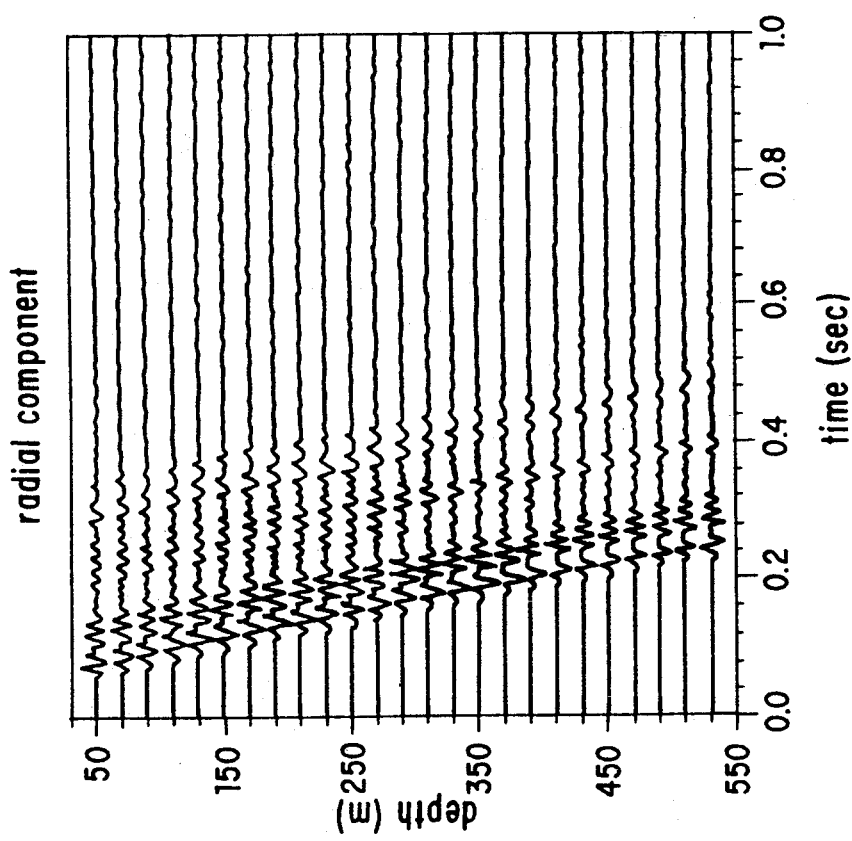
Figure 6:
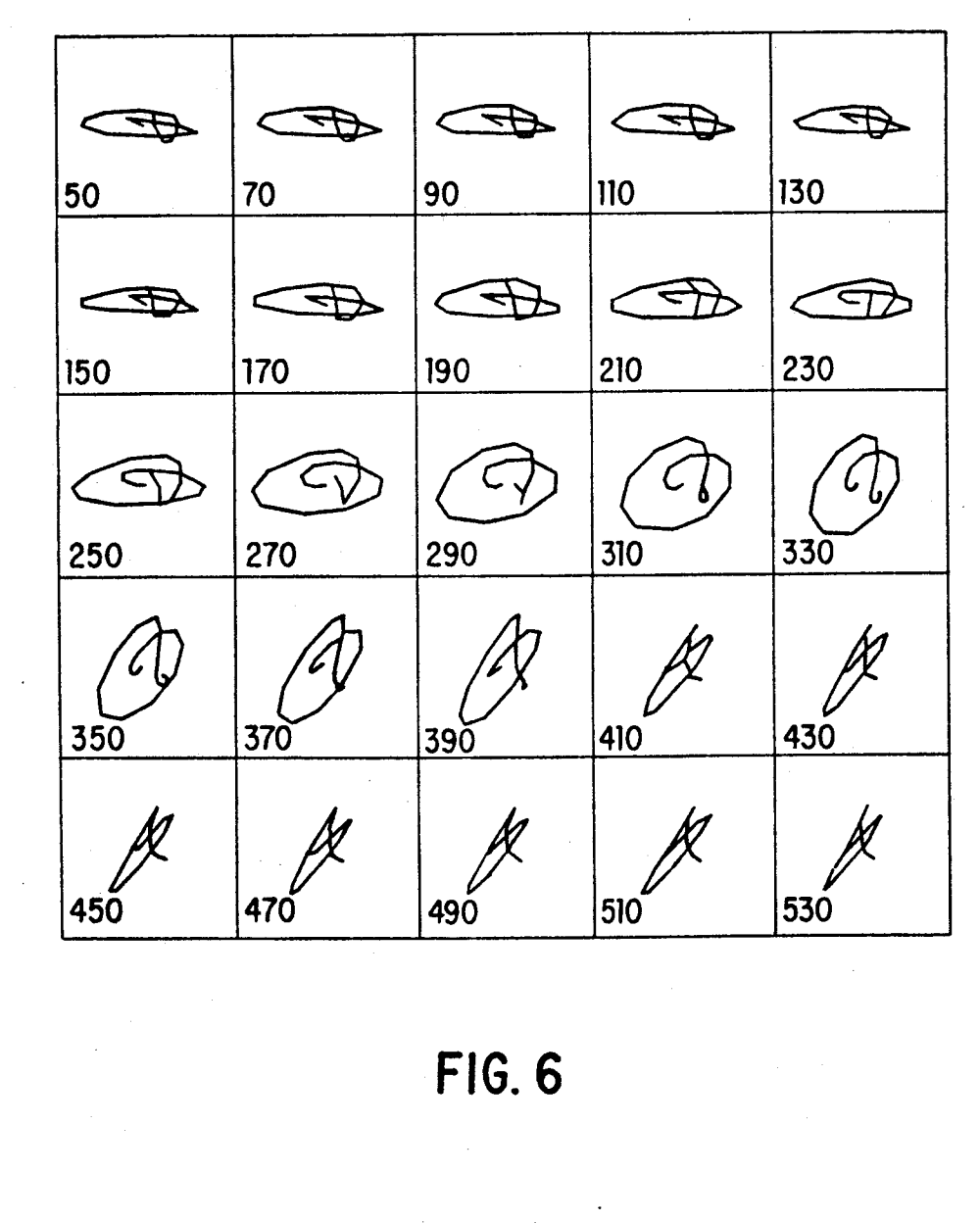
Figure 8:
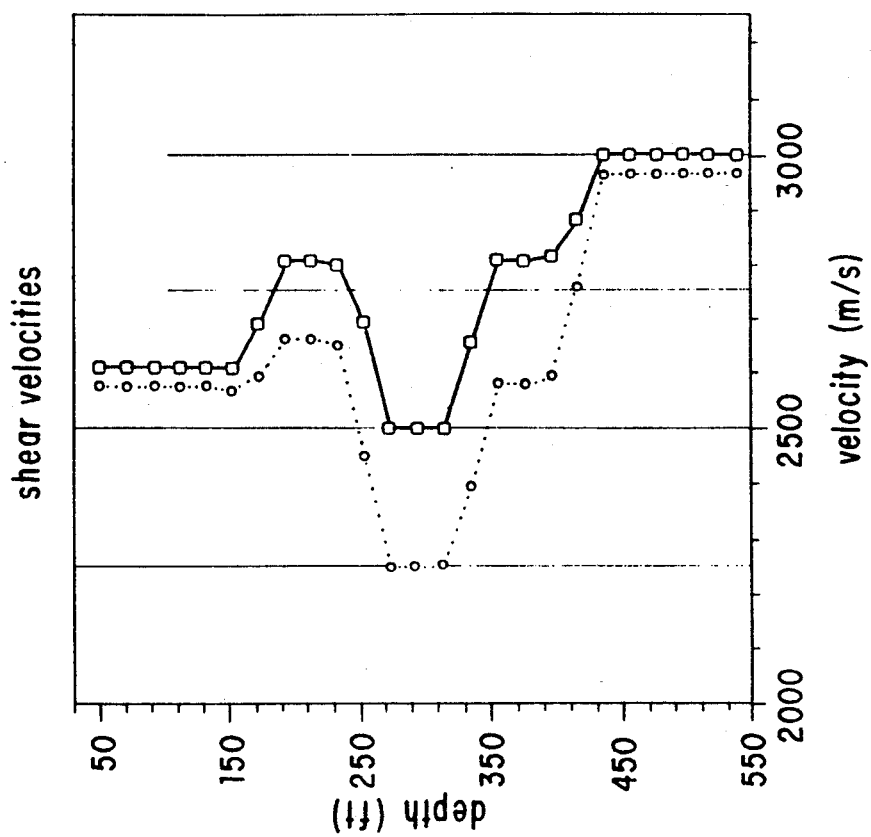
Figure 7:
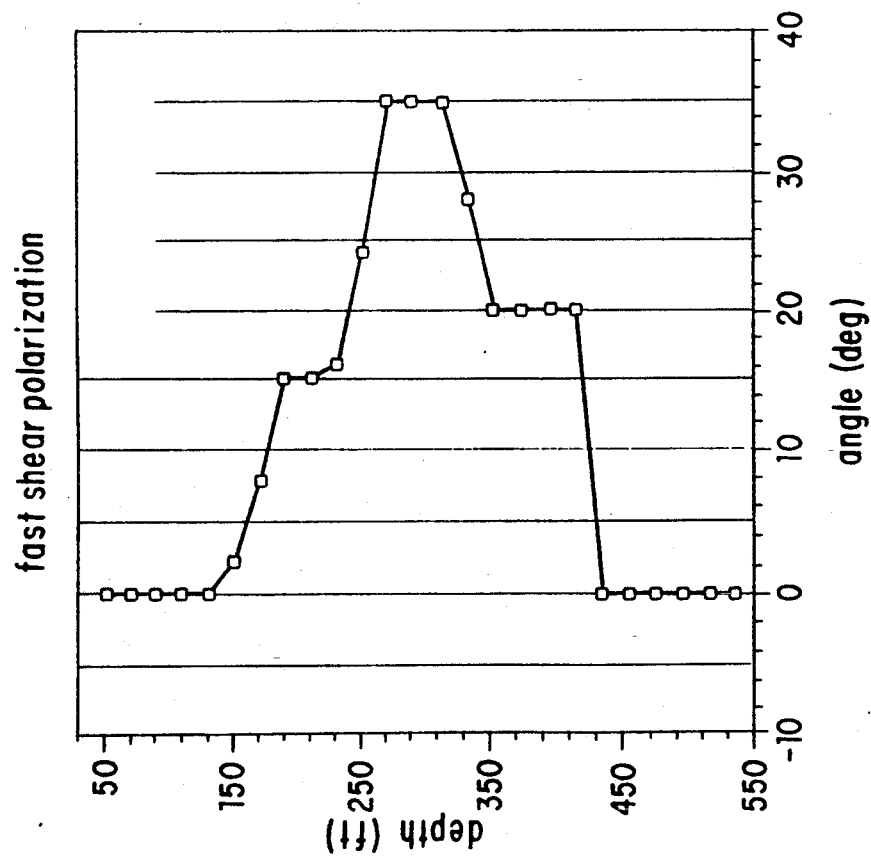
FIGS. 7 and 7 show the velocities of fast and slow shear waves, as a function of depth, obtained by 3-level local wave field inversion for the example of FIG. 4.

As an example of an application of the disclosed technique, the described local wave field inversion technique was tested on a synthetic VSP data set. The simplified formation model, shown in FIG. 4, consists of five horizontal layers. Each layer is characterized by two (fast and slow) shear velocities, density and angle $\theta$, which is the angle between the x-axis and the normal to the symmetry axis of the azimuthally anisotropic medium. The top and bottom layers are nearly isotropic with slow to fast shear velocity ratio $R=0.99$. The center layer is the most anisotropic with $R=0.90$ and $\theta=35$ degrees. Synthetic data simulating vertically incident shear waves are computed, in known fashion, using a one-dimensional finite-difference algorithm [Nicoletis et al., 1-D Modeling Of Shear Waves In Anisotropic Medium, 56th Ann. International Mtg., Soc. Expl. Geophys., Expanded Abstracts, 1133–1136 (1988)]. The radial (x) and transverse (y) components of actual shear waves recorded at 1000 m in a field experiment were used as the corresponding source components in the simulation algorithm. The computed radial and transverse components of the computed synthetic data, at depth levels from 50 to 550 feet, are shown in FIGS. 5A and 5B, respectively. FIG. 6 shows the hodograms, within 50 ms time windows following the first breaks, for each of the twenty-five indicated depth levels. The waves incident on the region of interest (in this case, the five-layer formation model) are not linearly polarized—a fact observed in field data more often than not. Although the hodograms show significant variation with depth, local polarization directions and velocities of split-shear waves cannot be determined from these plots mainly due to the small time delay between the two shear waves. At each recording depth (separated by 20 m) data from three neighboring levels [i.e., a depth window encompassing three depth locations] were used for local wavefield inversion in the manner previously described. FIG. 7 shows the inverted polarization angle $\theta$ of fast shear waves as a function of depth. Square marks indicate computation points. Results indicate that, at least on synthetic data, variations of angle on the order of two depth spacings can be accurately determined with three-level inversion. FIG. 8 shows the inverted fast and slow shear velocities. Again, results are accurate in each layer and spatial resolution is about two depth spacings.

The invention has been described with reference to particular preferred embodiments, but variations within the spirit and scope of the invention will occur to those skilled in the art. For example, if desired, lossiness and angular directionality can be incorporated into the model acoustic waves. Also, smaller portion of the measured waves can be extracted and processed in sections, if necessary or desirable.

I claim:

1. A method for determining properties of an anisotropic elastic medium, comprising the steps of:

establishing acoustic waves in said medium;

measuring, at several spaced locations in said medium, at least two orthogonal components of acoustic waves which have propagated through said medium;

computing, for positions corresponding to a plurality of adjacent ones of said locations, model composite waves which would result from the superposition of a plurality of model acoustic waves each having selected model parameters, said model acoustic waves including a plurality of slow and fast model acoustic shear waves propagating in opposite directions and said model parameters including model velocities and model polarizations for each of said model acoustic shear waves;

determining an error value which depends on the differences, at each of said plurality of adjacent ones of said locations, between measured wave components and the model composite waves;

modifying said model parameters;

iteratively repeating said computing, determining, and modifying steps to reduce said error; and storing the ultimately modified model parameters as being indicative of properties of said medium in the region of at least one of said plurality of adjacent ones of said locations.

2. The method as defined by claim 1, wherein said measured wave components are measured as a function of time and transformed to the frequency domain, and said error is determined in the frequency domain.

3. The method as defined by claim 1, wherein said superposition of model waveforms comprises a superposition of model waveforms having locally planar wavefronts.

4. The method as defined by claim 2, wherein said superposition of model waveforms comprises a superposition of model waveforms having locally planar wavefronts.

5. The method as defined by claim 1, wherein said modifying of said model parameters comprises modifying said parameters in a vector direction which tends to minimize said error value.

6. The method as defined by claim 1, wherein said positions corresponding to a plurality of adjacent ones of said locations are defined as being encompassed in a window, and further comprising the steps of successively moving said window, and repeating the method of claim 1, from the computing step onward, to obtain stored ultimately modified model parameters for each window position.

7. The method as defined by claim 1, wherein said positions corresponding to a plurality of adjacent ones of said locations are defined as being encompassed in a window, and further comprising the steps of successively moving said window, and repeating the method of claim 1, from the computing step onward, to obtain stored ultimately modified model parameters for each window position.

8. The method as defined by claim 1, wherein said model parameters comprise the velocities and polarization directions of said shear waves.

9. The method as defined by claim 4, wherein said model parameters comprise the velocities and polarization directions of said shear waves.

10. The method as defined by claim 1, wherein said model acoustic waves further comprise a compressional wave, and wherein said model parameters further comprise the velocity of said compressional wave.

11. The method as defined by claim 4, wherein said model acoustic waves further comprise a compressional wave, and wherein said model parameters further comprise the velocity of said compressional wave.

12. The method as defined by claim 1, wherein said measure components are measured in three orthogonal directions, and wherein said differences comprise differences between three dimensional vector quantities.

13. The method as defined by claim 4, wherein said measured components are measured in three orthogonal directions, and wherein said differences comprise differences between three dimensional vector quantities.

14. The method as defined by claim 1, wherein said locations are in a substantially linear and evenly spaced arrangement.

15. The method as defined by claim 4, wherein said locations are in a substantially linear and evenly spaced arrangement.

16. The method as defined by claim 1, wherein said medium is an earth formation.

17. The method as defined by claim 4, wherein said medium is an earth formation.

18. A method for determining properties of earth formations surrounding a borehole, comprising the steps of:

establishing acoustic waves in said formations;

measuring, at longitudinally spaced locations along the borehole, at least two orthogonal components of acoustic waves which have propagated through the formations;

computing, for positions corresponding to a plurality of adjacent ones of said locations, model composite waves which would result from the superposition of a plurality of model acoustic waves each having selected model parameters, said model acoustic waves including a plurality of slow and fast model acoustic shear waves travelling in opposite directions and said model parameters including model velocities and model polarizations for each of said model acoustic shear waves;

determining an error value which depends on the differences, at each of said plurality of adjacent ones of said locations, between measured wave components and the model composite waves;

modifying said model parameters;

iteratively repeating said computing, determining, and modifying steps to reduce said error; and storing the ultimately modified model parameters as being indicative of properties of said formations in the region of at least one of said plurality of adjacent ones of said locations.

19. The method as defined by claim 18, wherein said measured wave components are measured as a function of time and transformed to the frequency domain, and said error is determined in the frequency domain.

20. The method as defined by claim 18, wherein said superposition of model waveforms comprises a superposition of model waveforms having locally planar wavefronts.

21. The method as defined by claim 19, wherein said superposition of model waveforms comprises a superposition of model waveforms having locally planar wavefronts.

22. The method as defined by claim 18, wherein said modifying of said model parameters comprises modifying said parameters in a vector direction which tends to minimize said error value.

23. The method as defined by claim 18, wherein said positions corresponding to a plurality of adjacent ones of said locations are defined as being encompassed in a depth window, and further comprising the steps of successively moving said depth window, and repeating the method of claim 21, from the computing step onward, to obtain stored ultimately modified model parameters for each depth window position.

24. The method as defined by claim 21, wherein said positions corresponding to a plurality of adjacent ones of said locations are defined as being encompassed in a depth window, and further comprising the steps of successively moving said depth window, and repeating the method of claim 24, from the computing step onward, to obtain stored ultimately modified model parameters for each depth window position.

25. The method as defined by claim 18, wherein and said model parameters comprise the velocities and polarization directions of said shear waves.

26. The method as defined by claim 18, wherein said model acoustic waves further comprise a compressional wave, and wherein said model parameters further comprise the velocity of said compressional wave.

27. The method as defined by claim 18, wherein said measured components are measured in three orthogonal directions, and wherein said differences comprise differences between three dimensional vector quantities.

28. The method as defined by claim 22, wherein said measured components are measured in three orthogonal directions, and wherein said differences comprise differences between three dimensional vector quantities.

29. The method as defined by claim 18, further comprising the step of producing a log versus depth of said ultimately modified model parameters.

30. The method as defined by claim 18, further comprising the step of producing a log versus depth of said ultimately modified model parameters.

31. A method for determining properties of earth formations surrounding a borehole in which acoustic waves were established in said formations and, at longitudinally spaced locations along the borehole, there were measured at least two orthogonal components of acoustic waves which have propagated through the formations, comprising the steps of:

computing, for positions corresponding to a plurality of adjacent ones of said locations, model composite waves which would result from the superposition of a plurality of model acoustic waves each having selected model parameters, said .model acoustic waves including a plurality of slow and fast model acoustic shear waves travelling in opposite directions and said model parameters including model velocities and model polarizations for each of said model acoustic shear waves;

determining an error value which depends on the differences, at each of said plurality of adjacent ones of said locations, between measured wave components and the model composite waves;

modifying said model parameters;

iteratively repeating said computing, determining, and modifying steps to reduce said error; and storing the ultimately modified model parameters as being indicative of properties of said formations in the region of at least one of said plurality of adjacent ones of said locations.

32. The method as defined by claim 31, wherein said measured wave components are measured as a function of time and transformed to the frequency domain, and said error is determined in the frequency domain.

33. The method as defined by claim 32, wherein said superposition of model waveforms comprises a superposition of model waveforms having locally planar wavefronts.

34. The method as defined by claim 31, wherein said model parameters comprise the velocities and polarization directions of said shear waves.

35. The method as defined by claim 31, wherein said model acoustic waves further comprise a compressional wave, and wherein said model parameters further comprise the velocity of said compressional wave.

36. The method as defined by claim 31, wherein said measured components are measured in three orthogonal directions, and wherein said differences comprise differences between three dimensional vector quantities.

37. The method as defined by claim 31, further comprising the step of producing a log versus depth of said ultimately modified model parameters.

38. Apparatus for determining properties of earth formations surrounding a borehole:
- means for establishing acoustic waves in said formations;
- means for measuring, at longitudinally spaced locations along the borehole, at least two orthogonal components of acoustic waves which have propagated through the formations;
- means for computing, for positions corresponding to a plurality of adjacent ones of said locations, model composite waves which would result form the superposition of a plurality of model acoustic waves each having selected model parameters, said model acoustic waves including a plurality of slow and fast model acoustic shear waves travelling in opposite directions and said model parameters including model velocities and model polarizations for each of said model acoustic shear waves;
- means for determining an error value which depends on the differences, at each of said plurality of adjacent ones of said locations, between measured wave components and the model composite waves;
- means for modifying said model parameters;
- means for iteratively repeating said computing, determining, and modifying steps to reduce said error; and
- means for storing the ultimately modified model parameters as being indicative of properties of said formations in the region of at least one of said plurality of adjacent ones of said locations.

39. Apparatus as defined by claim 38, wherein said superposition of model waveforms comprises a superposition of model waveforms having locally planar wavefronts.

* * * * *